No. 819,500. PATENTED MAY 1, 1906.
G. C. BEARSE.
FISHING ROD.
APPLICATION FILED APR. 12, 1905.
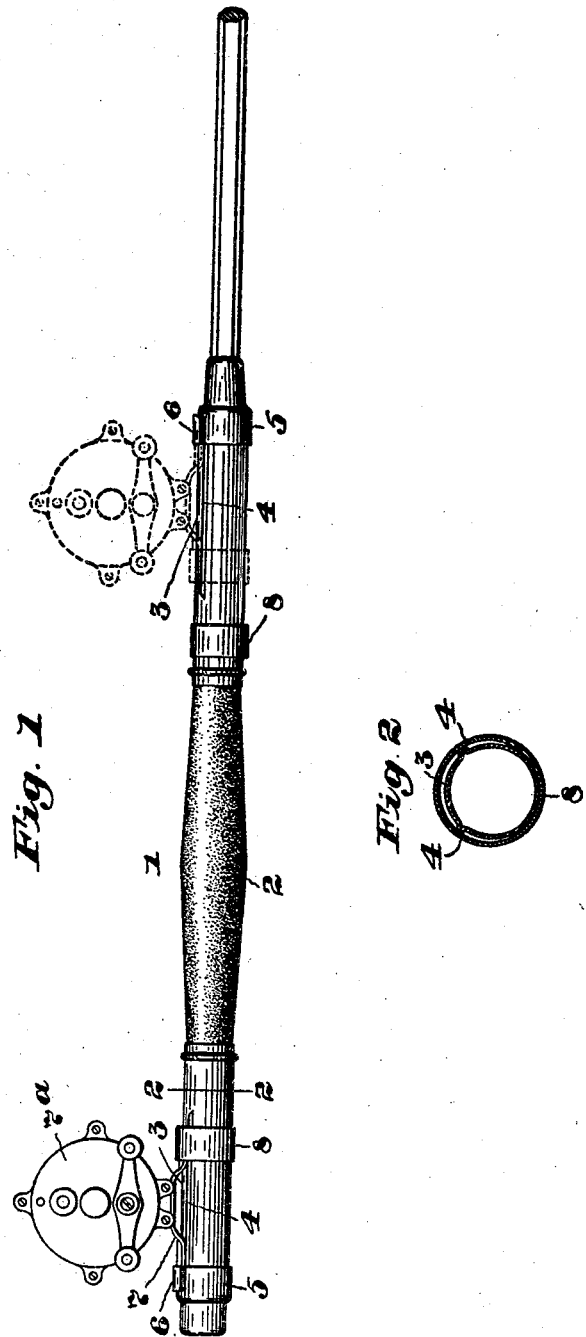
Witnesses:
Horace H. Crossman
Everett L. Emery
Inventor:
George C. Bearse.
by Emery Booth & Varrell
Attys.

UNITED STATES PATENT OFFICE.

GEORGE C. BEARSE, OF PORTLAND, MAINE.

FISHING-ROD.

No. 819,500.     Specification of Letters Patent.     Patented May 1, 1906.

Application filed April 12, 1905. Serial No. 255,077.

*To all whom it may concern:*

Be it known that I, GEORGE C. BEARSE, a citizen of the United States, and a resident of Portland, county of Cumberland, and State of Maine, have invented an Improvement in Fishing-Rods, of which the following description, in connection with the accompanying drawings, is a specification, like figures on the drawings representing like parts.

My invention relates to improvements in fishing-rods, and particularly to the manner of mounting the reel thereon; and the aim of the invention is to provide means whereby the position of the reel upon the rod may be readily changed to adapt the latter for use as a bait or trolling rod or for fly-casting, as desired.

The nature of my invention will be clearly apparent from a description of one particular embodiment thereof, which has been selected herein for illustration and is shown in the accompanying drawings, and its scope will be pointed out in the appended claims.

In the drawings, Figure 1 is an elevation of the handle of a fishing-rod, showing my invention; and Fig. 2 is a transverse section on the line 2 2, Fig. 1.

In accordance with my invention as shown in the embodiment selected for illustration I have provided the handle of the rod with reel-seats at both ends of the grip, whereby the reel may be positioned above the grip when the rod is to be used as a bait or trolling rod and may be changed to a position at the rear of or below the grip to adapt the rod for fly-casting. To this end the rod-handle 1 shown in the drawings herewith is provided above and below the grip 2 with extensions 3 3, affording longitudinal seats for the reel. To maintain the reel in alinement with the rod and the usual guide-loops, each seat extension may be provided with longitudinal ribs 4, which may be struck up from the material of the extensions or otherwise formed, as desired. The ferrules 5 at both ends of the handle are provided with sockets 6, adapted to receive one end of the reel stand or support 7 of the reel 7ª, the opposite end of which may be secured upon the seats 3 by means of slidable collars 8 at opposite ends of the grip 2. To shift the reel readily from front to rear of the grip, and vice versa, it is only necessary to slip the collar 8 off the reel-stand, shift the reel to the seat at the opposite end of the handle, and slip the collar 8 on that seat over the stand.

By providing the rod-handle with reel-seats at opposite ends of the grip, as herein described, detachment and reversal of the handle as now commonly practiced for the purpose of reversing the position of the reel is avoided, thereby obviating the wear upon and consequent loosening of the parts incident to this operation. Furthermore, in the arrangement of the reel-seats as herein shown the reel is maintained always upon the same side of the rod, whereby the alinement of the reel with the guide-loops upon the rod is maintained whether the reel is above or below the grip. With the reel-seats in alinement, as stated, it is possible to employ two reels upon the rod at the same time, whereby when the supply of line of one is exhausted that of the other may be connected with the first by a suitable clip and paid out from the second reel, thus providing for a larger amount of line than could be carried by a single reel of convenient size, the alinement of the reels on the same side of the handle affording an arrangement which readily adapts itself to this end.

It is to be understood that the details of construction herein described may be altered without departing from the spirit and scope of my invention and that the invention is not limited to the particular embodiment herein shown.

I claim—

1. A fishing-rod, having a butt provided with reel-seats at its opposite ends and in the same plane, combined with means to secure a reel in either of said seats.

2. A fishing-rod, having a butt provided with reel-seats at its opposite ends and in the same plane, combined with means to secure a reel in either or both of said seats.

3. A fishing-rod, having a butt provided with fixed sockets at opposite ends adapted to receive a reel stand or support, and collars slidable on said butt and adapted to engage the reel stand or support and thereby coöperate with the sockets to secure the reel stand or support upon the butt.

4. A fishing-rod, having a butt provided with fixed sockets at opposite ends adapted to receive a reel stand or support, and collars slidable on said butt and adapted to engage the reel stand or support and thereby coöperate with the sockets to secure the reel stand or support upon the butt, combined with a reel.

5. A fishing-rod handle or butt, having a grip, and reel-seats arranged upon the side of said handle or butt at both ends thereof and at opposite ends of the grip.

6. A fishing-rod handle or butt, having a grip, and longitudinal reel-seats arranged at both ends of the handle or butt and at opposite ends of the grip.

7. A fishing-rod handle or butt, having a grip, and longitudinal reel-seats arranged in alinement at both ends of the handle or butt and at opposite ends of the grip.

8. A fishing-rod butt, provided at each end with means for holding one end of a reel-stand, a grip on said butt between the same, and means at each end of said grip adapted to hold the other end of said reel-stand, whereby the reel may be held either above or below said grip.

9. A fishing-rod butt, provided at each end with a socket for holding one end of a reel-stand, a grip on said butt between the same, and means carried by said butt at each end of said grip and slidable on said butt and adapted to hold the other end of said reel-stand, whereby the reel may be held either above or below said grip.

10. A fishing-rod butt, provided at each end with a socket for holding one end of a reel-stand, a grip on said butt between the same, and means carried by said butt at each end of said grip and adapted to hold the other end of said reel-stand, whereby the reel may be held either above or below said grip.

11. A fishing-rod butt, provided at each end with a socket for holding one end of a reel-stand, a grip on said butt between the same, and a collar carried by said butt at each end of said grip and slidable on said butt and adapted to hold the other end of said reel-stand, whereby the reel may be held either above or below said grip.

In testimony whereof I have signed my name to this specification in the presence of two subscribing witnesses.

GEORGE C. BEARSE.

Witnesses:
    JOHN C. COBB,
    JAMES L. RACKLEFF.